United States Patent [19]

Tsimerman

[11] Patent Number: 5,460,004
[45] Date of Patent: Oct. 24, 1995

[54] DESICCANT COOLING SYSTEM WITH EVAPORATIVE COOLING

[75] Inventor: Alexandre Tsimerman, Odessa, Ukraine

[73] Assignee: ARI-TEC Marketing, Inc., Phoenix, Ariz.

[21] Appl. No.: 44,453

[22] Filed: Apr. 9, 1993

[51] Int. Cl.⁶ .................................................. F25D 17/06
[52] U.S. Cl. .................. 62/94; 62/271; 62/305; 62/311
[58] Field of Search .................. 62/92, 271, 304, 62/305, 306, 311, 314, 309

[56] References Cited

U.S. PATENT DOCUMENTS

| | | | |
|---|---|---|---|
| 1,819,643 | 8/1931 | Fleisher | 62/94 |
| 2,214,880 | 9/1940 | Crawford | 62/94 |
| 3,144,901 | 8/1964 | Meek | 62/94 |
| 3,247,679 | 4/1966 | Meckler | 62/94 |
| 4,941,324 | 7/1990 | Peterson et al. | 62/94 |

*Primary Examiner*—John M. Sollecito
*Attorney, Agent, or Firm*—Gregory J. Nelson

[57] ABSTRACT

A system for cooling and gases in which the process gas is dehumidified in a desiccant module and subsequently treated in a heat exchanger. Additional heat exchanger and gas washers may be included in the system. The system is operable in either an open or closed system to generate either cold gas or cold fluid or both. In a preferred embodiment, the heat exchanger has a dry channel in which both sensible and adiabatic gas cooling occurs and an adjacent counterflow wet channel. The desiccant may be either a liquid or solid and is regenerated.

6 Claims, 8 Drawing Sheets

DESICCANT COOLING SYSTEM WITH EVAPORATIVE COOLING

The present invention relates to a gas treatment method and more particularly to a unique system for fluid and gas cooling which utilizes water as a refrigerant instead of conventional refrigerants containing environmentally harmful CFC's or HCFC's.

Conditioning of air to cool the air to create a zone of increased comfort or for maintaining the zone at a lower temperature is well known. Refrigeration devices operating on the compression cycle using a refrigerant such as freon are also widely used. Compression cycle systems require considerable energy consumption and are expensive in both initial cost and maintenance. More importantly, environmental problems have been attributed to compression systems as these systems utilize a great deal of energy and also are believed to contribute to environmental pollution. CFC molecules, such as $CFCl_3$ (freon 11) and $CFCl_2$ (freon 12) released to the atmosphere from compression cycle refrigeration systems may enter into photochemical reactions with the ozone layer which may destroy this environmentally necessary layer of protection.

Another method is direct evaporative air cooling which avoids the use of CFC containing refrigerants. Direct evaporative cooling has wide application particularly in drier climates and is widely practiced and accepted since it is relatively simple approach requiring low energy consumption. The principle of evaporative cooling to cool air is based on the evaporation of water to absorb the latent heat of vaporization from the air which reduces the air temperature and increases the humidity of the air. However, direct evaporative cooling has an inherent limitation due to the fact that when the humidity of the air flow reaches saturation, the temperature and partial pressure is equalized and the heat and mass exchange process ceases.

Other methods, in an attempt to avoid use of potentially harmful refrigerants, employ indirect evaporative cooling methods which utilize heat exchangers having a dry surface along which the air flows, the opposite of which is cooled by evaporated water. A system of this type is shown in my prior patent, U.S. Pat. No. 5,050,391.

Desiccant systems are also known and represent a viable alternative to compression cycle systems. A desiccant system utilizes a composition which removes moisture from the air or gas passing through the desiccant.

Various patents can be found in the prior art which employ both solid and liquid desiccant components. For example, U.S. Pat. No. 4,171,620 discloses a cooling method and system in which a stream of wet, warm air is passed in contact with a liquid hygroscopic material in a water-cooled absorbent zone to produce a stream of relatively cool, dry air. The cool, dry air is then passed through an evaporative cooling zone in contact with water and the resulting cooled air or water is used as a cooling and refrigerating media. The method and apparatus also facilitates mass exchange between the gas and the liquid.

U.S. Pat. No. 4,864,830 discloses an air conditioning apparatus and process with absorption of water vapor and a circulating absorption liquid containing an aqueous salt solution. The absorption liquid to be supplied to the absorber is cooled by indirect contact with a circulating water stream in a heat exchanger.

U.S. Pat. No. 4,786,301 shows a desiccant air conditioning system having a heat exchanging desiccant bed defining air passageways and liquid circulating channels for circulating heat transfer of liquid in heat exchange relationship with the desiccant bed.

U.S. Pat. No. 4,982,575 discloses a dehumidification and cooling apparatus for air conditioning. Dehumidification of air and reactivation of spent desiccant is achieved by the energy of the outdoor air.

As indicated above, there has been a renewed interest in alternate cooling systems which are capable of achieving relatively low temperatures. The present invention provides an efficient method and apparatus in which air is treated with a desiccant.

Briefly, the method and apparatus of the present invention are used for fluid or gas cooling and are based on the use of water as a refrigerant instead of CFC's or HCFC's and which system operates at atmospheric or near atmospheric pressures. The driving force of the cycle is heat. The system may be an open or closed loop cycle depending upon ambient conditions and the required temperature level of the generated cooling media. In the closed system of operation, the cooling unit may be filled with air, hydrogen, helium or other mixtures of gases. Accordingly, although the term "air" is used, it is understood to encompass other gases as indicated. Similarly, the term "water" is used herein as being representative of various fluids that may be chilled, such as water, brine solutions and the like. The system is used to generate either cold fluid or cold gas, or both.

In a preferred embodiment, process air is directed through a pre-cooling air-to-water heat exchanger, a desiccant dehumidification module, and a second air-to-water heat exchanger. Both heat exchangers receive cooling water from a cold water source which may be a cooling tower or other available source such as a body of cold water. The process air stream is then directed to an indirect/direct evaporative air/water cooler in which the air is first subjected to sensible cooling as the air stream is passed through heat exchange tubes surrounded by wetted evaporative media and a portion of the sensibly cooled air is directed through the evaporative media surrounding the tubes and is subjected to evaporative cooling. A secondary loop circulates water from a sump in the heat exchanger to a liquid-to-liquid heat exchanger for secondary cold water generation.

In other embodiments, the air stream may be directed through a dehumidification module and a series of air-to-water heat exchangers. The air is cooled in the air-to-water heat exchanger and the air is then directed to an air washer to cool the water. A portion of the cold water from the air washer is circulated via the water-to-water heat exchanger directly to a remote use.

In still other alternate embodiments the air stream is first subjected to desiccant dehumidification and subsequent treatment including cooling in an indirect heat exchanger having adjacent wet and dry channels in which a portion of the process air is redirected countercurrently through the wet channel.

The above and other objects, advantages and features of the present invention will become more apparent from the following description, claims and drawings in which:

The apparatus and method of the present invention are utilized for cooling of fluid and gas and use water as a refrigerant in place of refrigerants containing CFC's or HCFC's. The driving force in the cycle is heat and the required energy to operate the processes is less than that required with conventional heat absorption or steam ejection systems of comparable capacity. The system of the present invention is not limited in geographical or climatic application.

The working pressure in the system of the present invention is nearly atmospheric and remains essentially constant. This enables the components to be manufactured at relatively low cost. The system may also function with various brine solutions or various other low boiling point liquids. The gas cavity of the cooling unit may contain air, hydrogen, helium or any other specially selected mixture of gases although as indicated the term "air" is used for convenience of the description set forth. The term "water" is also used for convenience to denote various fluids. The system may operate on an open or closed-loop cycle depending on outdoor conditions and the required temperature level of the generated cooling media. The system can be utilized to generate cold gas, cold fluid or a combination of the two.

Figure 1:
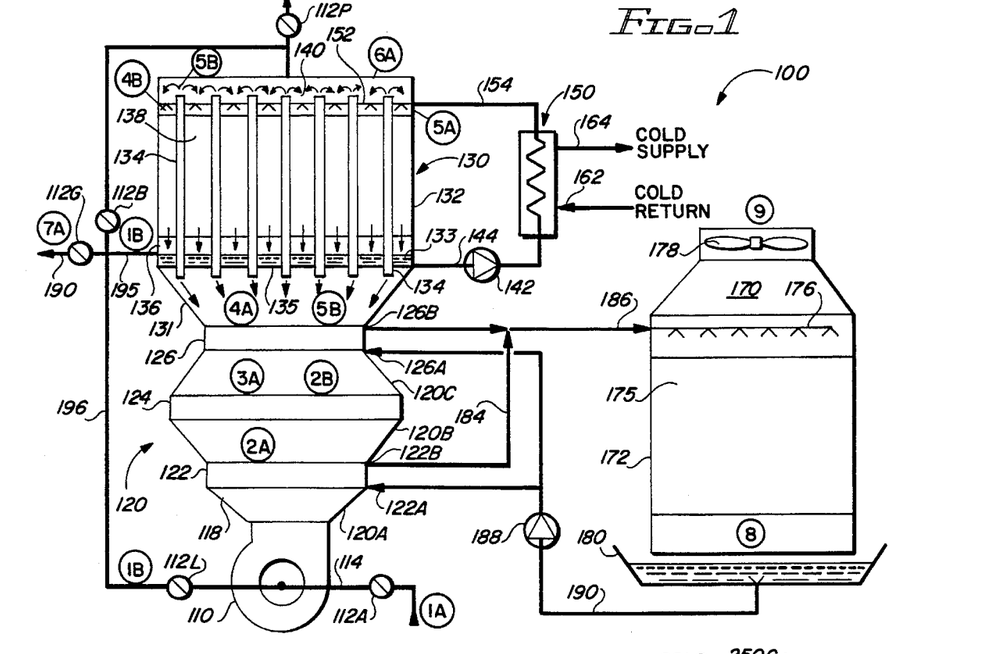
FIG. 1 is a schematic flow chart of a preferred embodiment of the present invention employing air pre-cooling and a cooling tower. The system will generate either cold water or cold air.

FIG. 1—General Description

Turning now to the drawings, particularly FIG. 1, a preferred form of the invention is shown and is generally designated by the numeral 100 which includes an air mover 110 having an inlet 114 controlled by an air damper 112A.

The air mover discharges an air stream into a housing 118 of heat exchanger and desiccant module 120 which module contains a first air-to-water heat exchanger 122, a dehumidification module 124 and a second stage air-to-water heat exchanger 126. The housing 118 is shown as having divergent sections 120A, 120B and a converging section 120C, although it will be appreciated that the housing may be of any convenient shape or may consist of separate modular units suitably interconnected. Similarly, the design and configuration of the heat exchangers may be a conventional tube, radiator or other type which are well known to those skilled in the arts.

Cooling water is introduced into air-to-water heat exchanger section 122 at inlet 122A and circulated through internal heat exchange members as is well known. The water exits the heat exchanger at 122B. As will be explained hereafter, cooling water is supplied to the heat exchanger from any available source such as cooling tower 170 and the heated water exiting the heat exchanger at discharge 122B is returned to the cooling tower to be cooled. Other sources of cooling water may be utilized if available such as lake water, river water, ocean water or cool water resulting from a separate process.

Dehumidification module 124 is located downstream from the first stage heat exchanger 122. The dehumidification module 124 contains a suitable desiccant material selected from materials which are well known and may consist of silica gel, a molecular sieve, zeolite material, aluminum oxide or similar materials. The dehumidification module is preferably regenerable including, as for example, an electric heating element 125 to regenerate the desiccant material when saturated as is well known. Heat for regeneration may also be provided by other energy sources such as natural gas, solar radiation, steam, hot water from another process of the like.

The second stage air-to-water heat exchanger 126 receives the dehumidified air discharged from the dehumidification module 124. Heat exchanger 126 is similar in construction to heat exchanger 122 and receives cooling water at inlet 126A which is circulated through the heat exchanger elements and discharged at 126B. The inlet and outlet of the heat exchanger 126 are suitably connected to cooling tower 170 or other source of cooling water.

The air discharged from the second stage heat exchanger 126 is directed to evaporative air/water cooler 130 via duct 131. The cooler 130 includes an exterior housing 132 which has a sump or basin 133 having a horizontal floor 135. A plurality of heat exchange tubes 134 are vertically disposed within the housing and extend through the floor 135 of the basin. The tubes are suitably sealed around their exterior to prevent leakage from the sump. A body of porous evaporative media 138 fills the area around the heat transfer tubes 134. The upper end of the heat transfer tubes 134 communicate with upper plenum chamber 140 and the lower ends receive the air exiting the heat exchanger 126 in duct 131. A lower plenum 136 is defined between the basin and the bottom surface of the media 138. Air from plenum may be directed to a point of use across damper 112P or returned to air mover 110 via duct 196 and dampers 112B and 112C. Air from plenum 136 may be directed to use at 190 across damper 112A or to the air mover via duct 196 across damper 122L.

Pump 142 has an inlet which communicates with the water in sump 133 at conduit 144. The pump 142 discharges cold water into water-to-water heat exchanger 150 which may be of known construction. The water discharged from the heat exchanger 150 is directed by return conduit 154 to a water distribution system 152 located above the upper surface of the porous evaporative media 138 but below the upper distal end of the heat exchange tubes 134. Water to be chilled is delivered to heat exchanger 150 via conduit 162 and indirectly contacted with the fluid from the module 130 with the cold water supply being available at heat exchanged discharge 164 from where it may be directed to a point of use.

As indicated, various sources of cooling water may be utilized and a conventional cooling tower 170 is shown providing cooling water to the heat exchanger sections 122 and 126. The cooling tower has an exterior housing 172 containing evaporative media 175. Water distribution manifold 176 discharges across the upper surface of the evaporative media 175. As is conventional, an air mover or fan 178 at the upper end of the cooling tower induces a flow of air upwardly through the evaporative media. A sump or water basin 180 is located at the lower end of the tower beneath the evaporative media. Warm water discharged from heat exchangers 122 and 126 is directed via conduits 182 and 184 to common conduit 186 supplying the cooling tower water distribution system 176. The water is cooled as it flows through the evaporative media 175 due to the well known evaporative effect. The cooled water collects in sump 180 and from there is supplied to the respective inlets 122A and 126A of the air-to-water heat exchangers 122 and 126 by means of pump 188 connected to the sump via conduit 190.

The cooling system of FIG. 1 operates to generate either cold water or cold air. The operation of the system will be first described with reference to cold water generation.

Figure 1A:
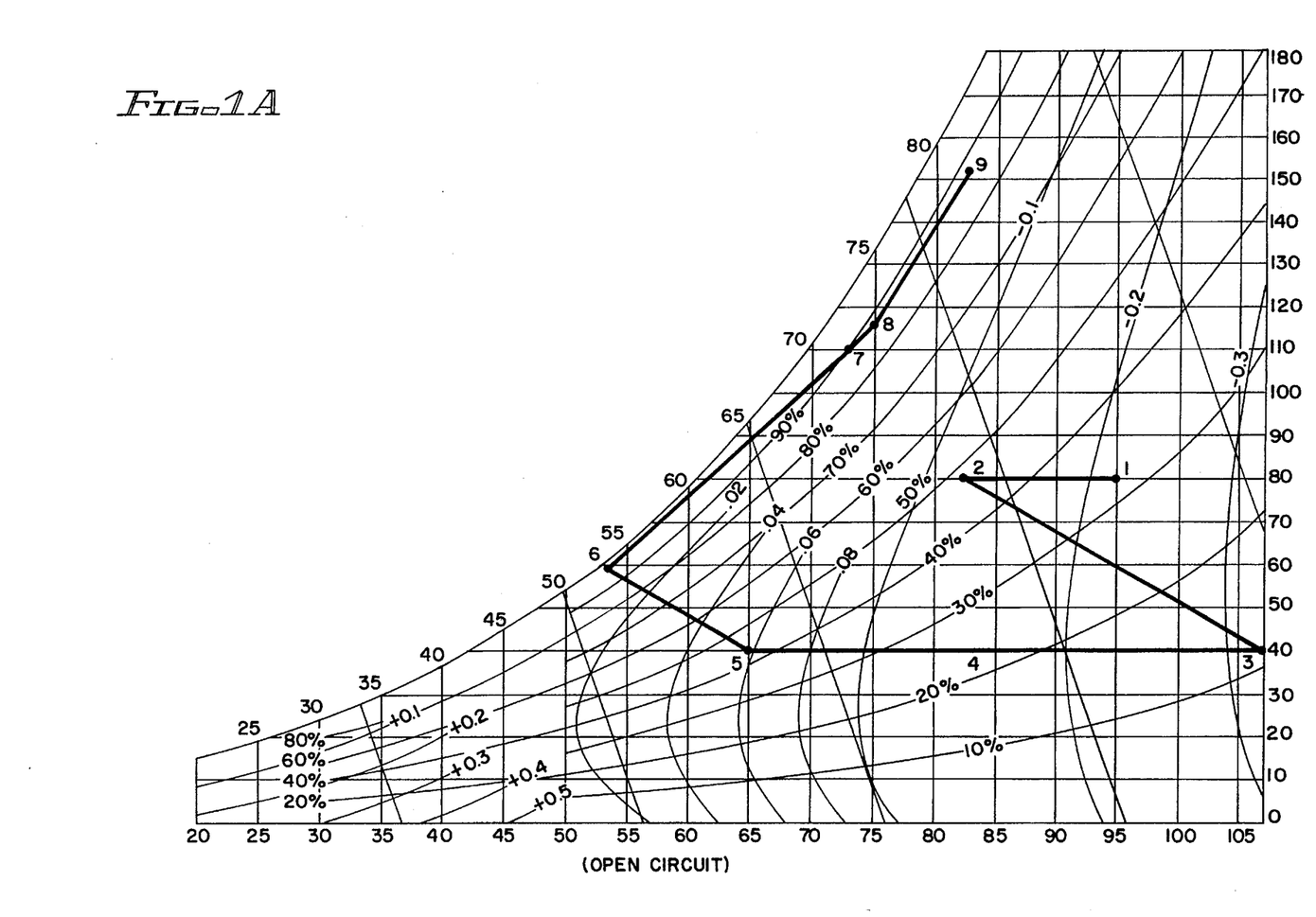
FIGS. 1A and 1B are psychrometric charts representative of both the open and closed circuit process carried out by the apparatus of the present invention as shown in FIG. 1.
Figure 1B:
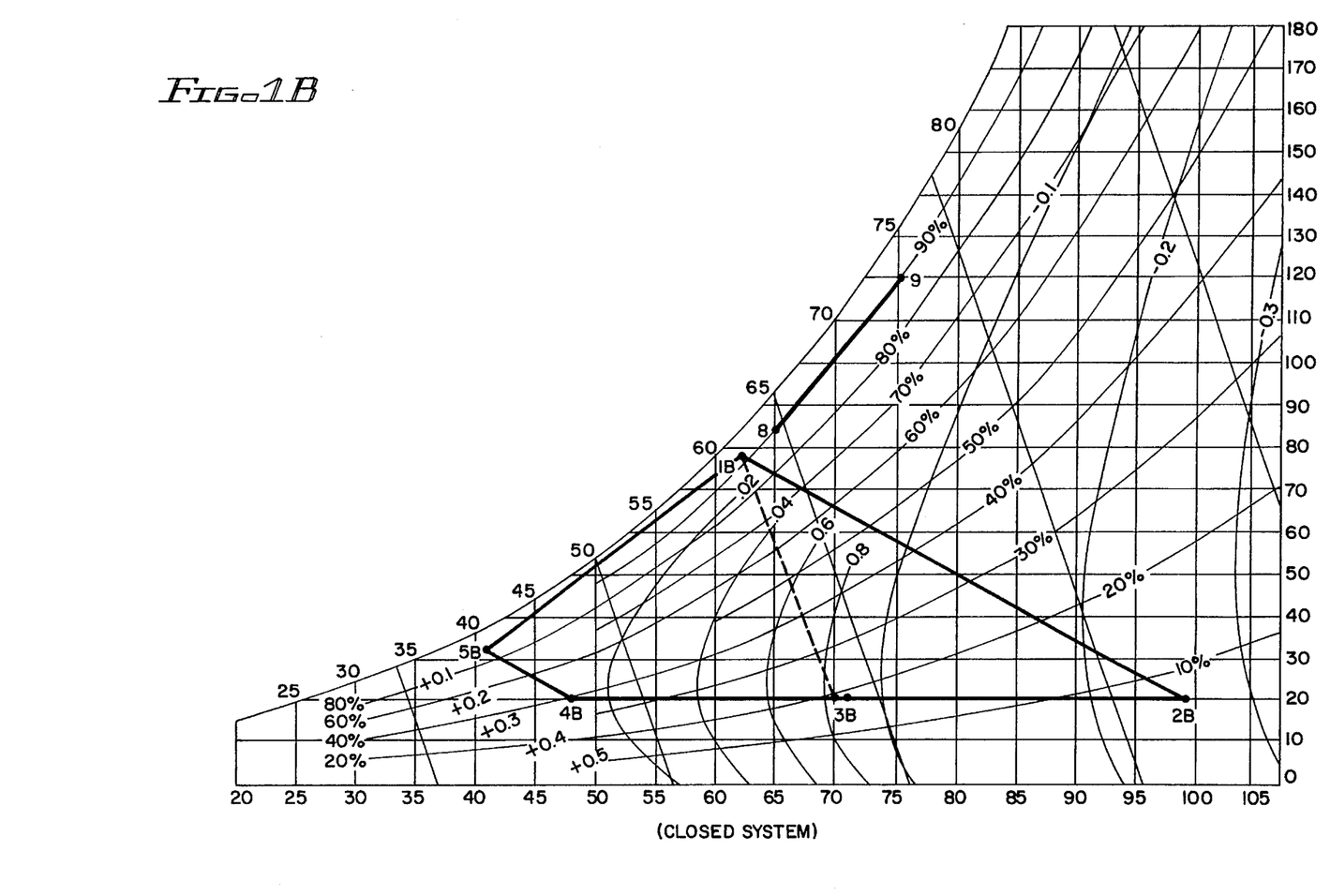

FIG. 1 and FIG. 1B—Cold Water Generation (Closed Cycle)

In operation in this mode, the inlet air stream supplied to air mover or fan 110 is 100% recirculated, process air from plenum 136 and, in some cases, from plenum 140. The dampers 112A, 112G and 112P are closed. Damper 112L is open. Damper 112B may be closed or partially open.

The process air fan 110 discharges recirculated air through the first stage pre-cooling air-to-water heat exchanger 122 which transfers heat to the circulating water stream flowing from the cooling tower via conduit 190. The air stream then flows through the desiccant humidification module 124 where the air is dehumidified and some heating of the air occurs. It will be noted that various points of entry and discharge in the system are indicated on FIG. 1 by a circled number and letter. The appended letter "B" appearing on FIG. 1B represents a closed system. The appended letter "A" indicates the conditions of the air at various locations in an open system as shown in FIG. 1A of the accompanying psychrometric chart. As for example, the conditions of the air entering the fan 110 when operating as a closed system are indicated by the designation (1B).

After dehumidification and heating in module 124, indicated by point (2B) on FIG. 1B, the air stream is directed to the second air-to-water heat exchanger 126 where it is cooled to conditions (3B) due to heat transfer with the water circulating through the heat exchanger. As indicated, cooling water is supplied to the inlet 122A and 124A of both heat exchanger sections from the cooling tower 170. The water discharged from the heat exchangers 122 and 124 which has been heated is returned via conduit 186 to the cooling tower for cooling and recycling.

After exiting the heat exchanger and desiccant module, the process air is directed into the evaporative air/water cooler 130 where it passes through an array of heat transfer tubes 134. The heat transfer tubes are surrounded by a porous evaporative media 138 which is wetted by water distributed from the manifold 152 at the upper surface of the evaporative media. The water flows downwardly through the evaporative media and is collected in the sump 133 at the lower end of the cooling unit 130. Water is recirculated from sump 133 by means of pump 142 through the heat exchanger 150 and eventually is circulated back to the distribution manifold 152.

As indicated above, the tubes depend through the floor of the sump into the plenum 131. The tubes are sealed around their exterior where they penetrate the sump floor. The process air exiting the heating exchanger 126 enters the lower end of the tubes below the sump and flows through the heat transfer tubes. Sensible cooling occurs as the air passes through the tubes as heat is transferred through the tube walls to the wetted evaporative media and the water within the sump.

The sensibly cooled air is discharged at the lowest temperature at the upper end of the heat transfer tubes and is reversely directed downwardly through the porous evaporative cooling media. The warmed air exits the evaporative media in the lower plenum 136 located beneath the porous media and above the water level in the sump. The heat-mass transfer process occurs during contact between the cold air and the water within the evaporative media resulting in cooling of the water and warming of the air. The warmed and humid air stream then exits the plenum 136 and via ducts 195 and 196 returns to the air mover 110.

The cold water from the sump 133 flows through the heat exchanger 150 as indicated. This water is termed the "primary" cold water. A secondary water loop supplies a fluid at inlet 162 from a desired remote heat transfer application. As the secondary water is pumped through the heat exchanger 150, the water or fluid is chilled as heat is transferred into the cold generating system described. Thus, cold fluid exits the heat exchanger at discharge 164 for remote usage.

As indicated, FIG. 1B illustrates the cold water generation process described in connection with a psychrometric chart with the selected process points indicated by the corresponding indicia which appear on FIG. 1.

FIGS. 1 and 1A—Cold Air Generation (Open Cycle)

The system described in FIG. 1 may also be used to generate cold air and this mode of operation is represented on psychrometric chart FIG. 1A. In referring to FIG. 1A, various corresponding process points are shown on FIG. 1 and indicated by a circled number and letter, i.e. (1A). In the cold air mode of operation, the process air stream to be treated is 100% outside air at conditions as indicated by point (1A). Liquid-to-liquid heat exchanger 150 remains inactive with pump 142 off. Dampers 112A, 112G and 112P are open and damper 112L is closed. Damper 112B is either closed or partially open.

The process air flow and heat exchange through the system is basically the same as has been described above with reference to cold water generation. The primary difference is that the air stream is split after the air exits the heat transfer tubes 134 in the cooler 130 with cold air being discharged across both damper 112P from plenum 140 and also discharges across damper 112G from plenum 136 below the lower surface of the evaporative media. No return air is directed to the fan 110 and the primary liquid-to-liquid heat exchanger 150 is off. Cold air is directed to a point of use across dampers 112P and 112G.

Figure 2:
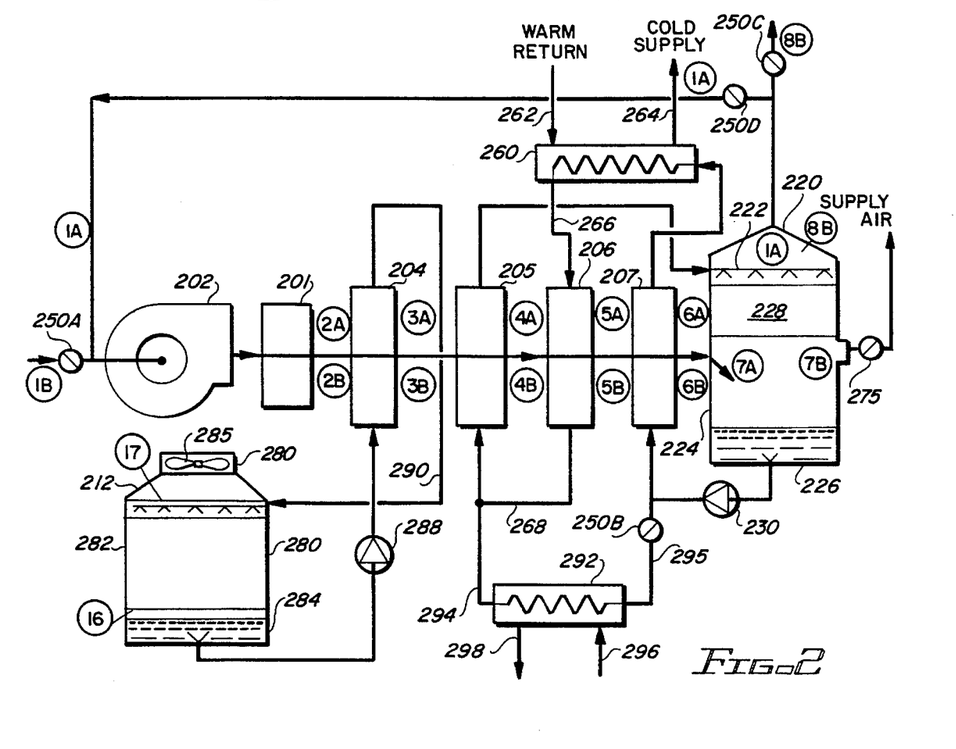
FIG. 2 is a schematic flow chart of another embodiment of the present invention employing a desiccant dehumidification module, air-to-liquid heat exchangers, air washer, cooling tower and optional heat exchangers.

FIG. 2—Closed/Open Cycle W/Air-Liquid Heat Exchanger

Figure 2A:
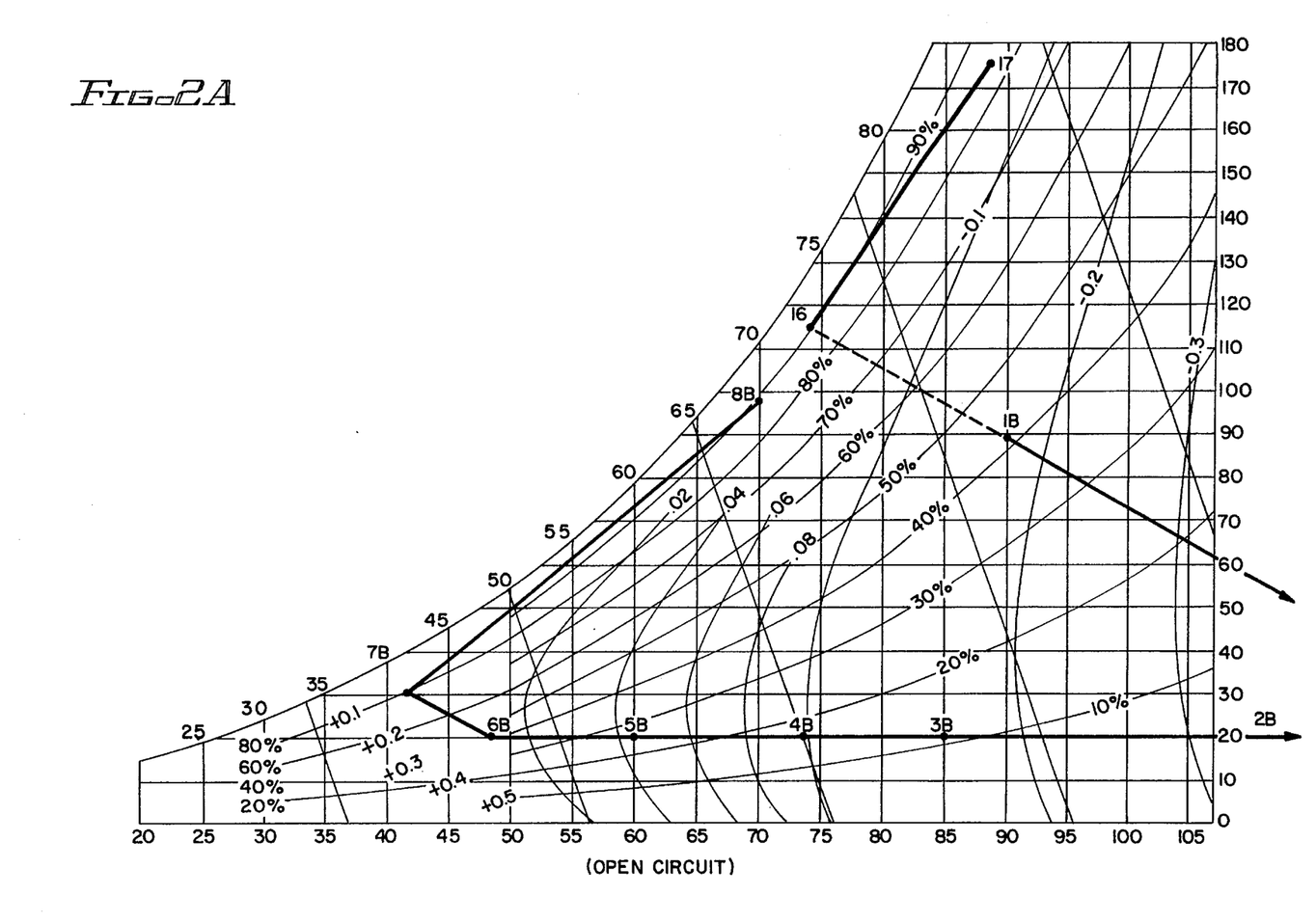
FIGS. 2A and 2B are psychrometric charts representative of open and closed circuit process carried out by the system of FIG. 2.
Figure 2B:
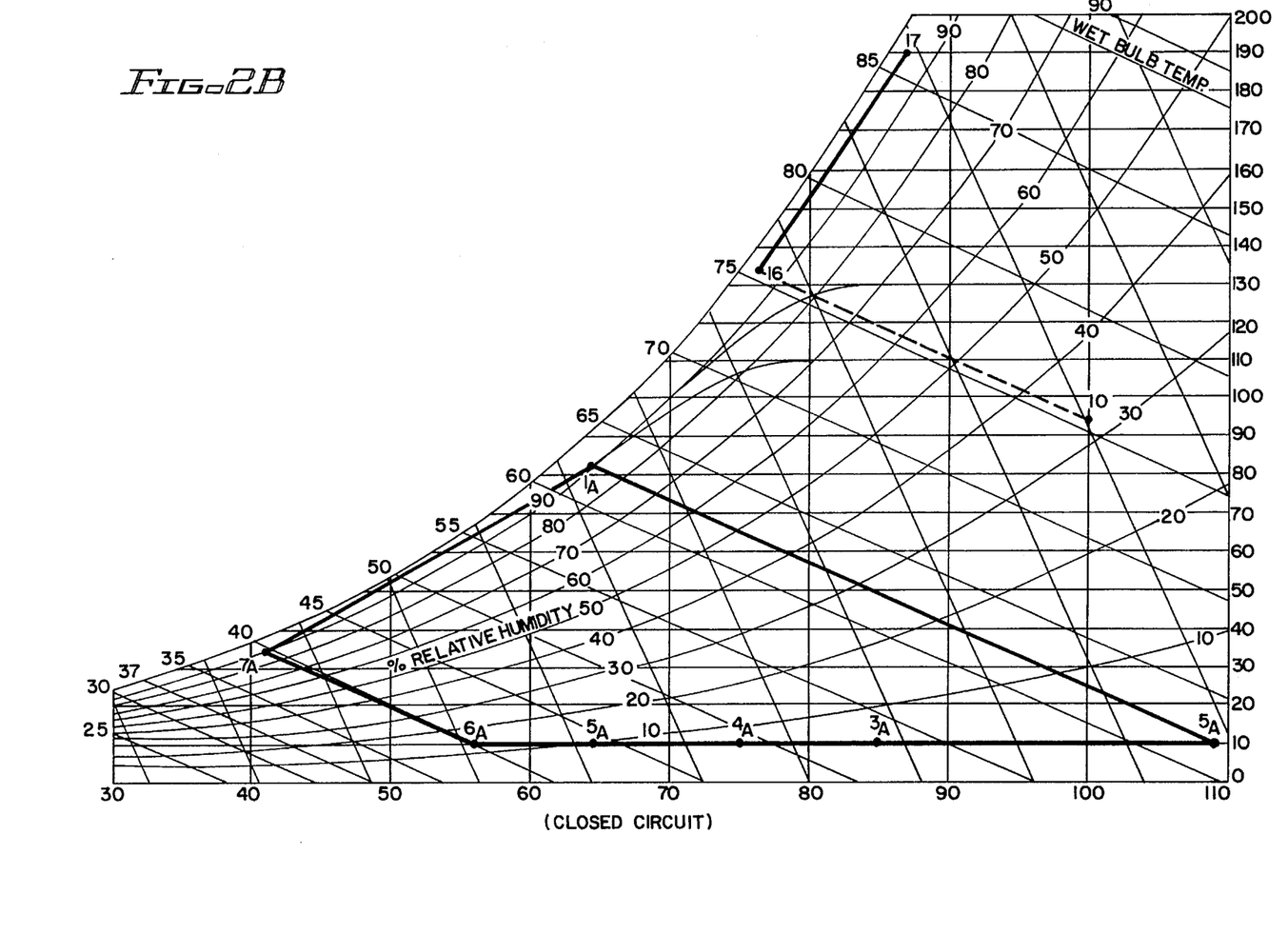

FIG. 2 is a schematic view of another embodiment of the system. FIGS. 2A and 2B are a psychrometric chart showing various process conditions at open and closed circuit modes of operation, respectively. The system of FIG. 2 is a closed or open cycle air or water cooler utilizing a solid desiccant and air-to-water and water-to-water heat exchangers with an air washer.

FIGS. 2 & 2B Cold Water Generation (Closed Cycle)

The closed cycle of operation for cold water generation will be initially described. In the closed cycle dampers 250A, 250B and 250C are closed and 250D is open. Fan 202 circulates the air stream to be treated through desiccant dehumidification module 201. The conditions of the air entering the fan or air mover corresponds to (1A) on the accompanying psychrometric chart, FIG. 2B. The air leaving the module 201 is at conditions indicated at (2B). The air exiting the dehumidification module 201 enters the initial air-to-water heat exchanger 204 where the-air is sensibly-cooled due to heat exchange with the water circulating from the cooling tower 212. The air exits heat exchanger 204 at conditions indicated as point 3B on the accompanying psychrometric chart.

The air stream then flows successively through heat exchanger units 205, 206, 207 where the air stream temperature is gradually lowered as indicated on the psychrometric chart. Cooling water for heat exchangers 205, 206 and 207 is provided by cold water generated in the air washer 220. The air washer has a distribution manifold 222 located in the upper end of housing 224. An evaporative media 228 is contained in the housing beneath the distribution system and a sump 226 is located at the bottom of the housing and circulates water to heat exchanger 207 via pump 230. Water exiting heat exchanger 207 is split and is directed to secondary heat exchanger 260 which may be a water-to-water heat exchanger or water-to-air heat exchanger. The air flow is split in washer 220 as supply air is discharged across damper 250B and recirculating air is directed across damper 250D. Damper 250C is closed. In the closed cycle water from sump 226 is split and is directed to both heat exchanger 207 and t secondary heat exchanger 292. A secondary fluid from a remote source is introduced into secondary heat exchanger 260 at 262 and returned at 264 for use at a remote location. The primary water loop of heat exchanger 260 is connected to air-to-water heat exchanger 206 by conduit 266. Conduit 268 interconnects air-to-water heat exchangers 206 and 205. The loop is completed by conduit 270 which returns water from second stage air-to-water heat exchanger 205 to the distribution manifold 222 of the air washer 220.

Cooling tower 212 is a conventional design having a housing 280 which contains an evaporative media 282 and defines a sump 284 in the bottom of the housing. A fan 285 in a fan housing at the upper end of the tower induces upward flow of air through the unit. The cooled water in the sump 284 is directed via pump 288 to first stage air-to-water heat exchanger 204. The return from heat exchanger 204 flows through conduit 290 to the distribution manifold 292 located above the upper surface of the media 282.

Cooling liquid for heat exchangers 205, 206 and 207 is provided by the cold water generated in the air washer 220. A portion of the cold water from the air washer 220 may be also circulated via conduit 295 to remote heat exchanger 292 from which the warm primary water enters heat exchanger 205 and then returns to the air washer. A remote source of fluid to be cooled is introduced to the heat exchanger 292 at 296 and cooled fluid discharged at 298.

The number of heat exchangers 205, 206 and 207 may vary with process requirements. Similarly, the location of heat exchangers 260 and 292 may vary and may be used to provide a cooled secondary source of either air or water to the user. Heat exchangers 260 and 292 may be any conventional type of heat exchanger such as a plate or tube type or other configuration. In the closed system, cold water is generated for use as a cooling fluid in heat exchangers 260 and 292.

FIGS. 2 and 2A (Open Cycle)

In the open cycle of operation, cold air is generated. The conditions of the system of FIG. 2 as an open cycle system are shown in FIG. 2A. The various process conditions are represented by points 1B to 8B on these figures. The process air is entirely outside air with initial dehumidification occurring across module 201 and successive incremental cooling occurring across exchangers 204, 205, 206 and 207. Treated and cooled air is discharged across damper 250C at conditions 8B as indicated on FIG. 2B. Damper 250A is open as are dampers 250C and 250C. Damper 250D is closed and water valve 275 may be open or partially closed.

Figure 3:
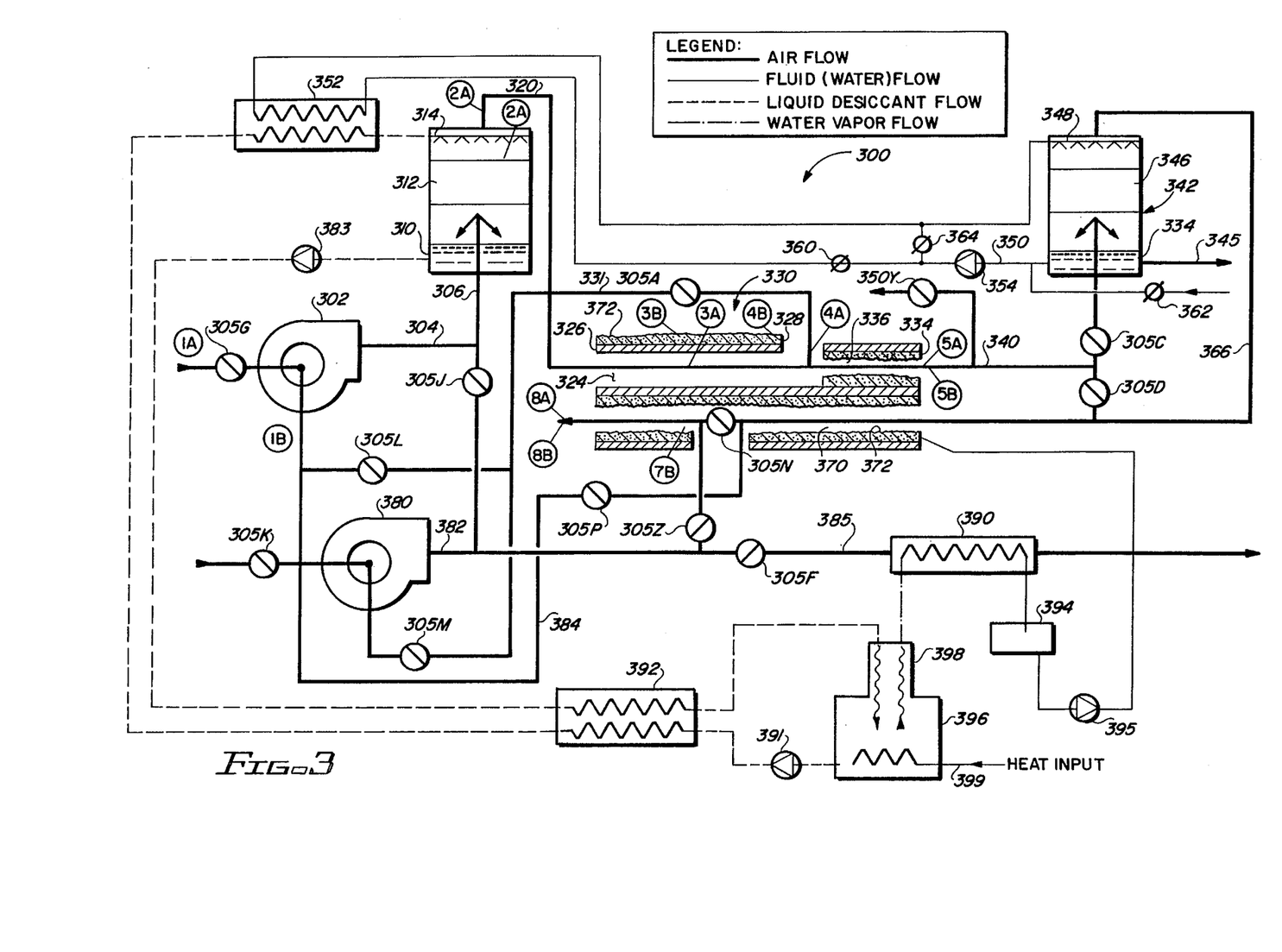
FIG. 3 is a schematic illustrating still another embodiment of the present invention employing a liquid desiccant.
Figure 3A:
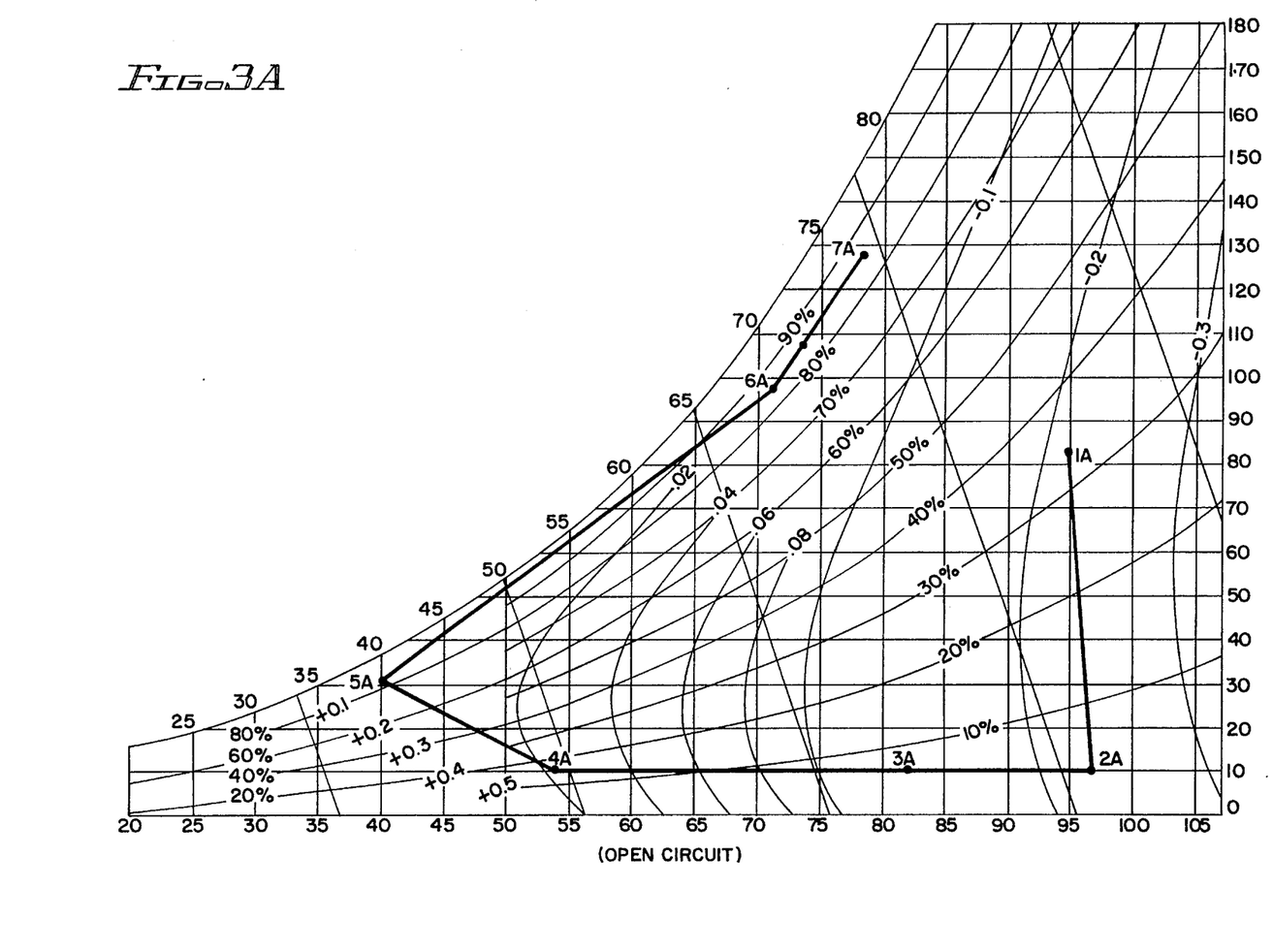
FIGS. 3A and 3B are psychrometric charts representative of both open and closed circuits carried out by the system of FIG. 3.

FIGS. 3 & 3A—Closed/Open Cycle Gas/Liquid Cooler General Description With Air/Air Heat Exchange & Liquid Desiccant Referring to FIG. 3, an alternate system according to the invention is shown which system is generally designated by the numeral 300. The system of FIG. 3 is capable of generating cold water in the closed circuit mode and cold air in the open circuit mode of operation. In the open circuit mode, both cold air and cold water can be simultaneously generated.

In the open circuit mode, the apparatus may use either 100% ambient air or a mixture of ambient and return air. When 100% ambient air is supplied to the system, a portion of the conditioned air is supplied to the user and the other part having been utilized as a heat transfer medium is exhausted to the outside at 305Y. The system of FIG. 3 includes a process air fan 302 having discharge conduit 304. The discharge conduit 304 connects with conduit 306 supplying air washer/dryer 308. Air washer/dryer 308 has a water collecting sump 310 located in its bottom and an intermediate section containing an extended surface inert media 312. Distributor 314 is located at the upper end of the housing for distribution and directing a liquid desiccant downwardly through media 312.

The air exiting the upper end of the washer is directed via conduit 320 to a heat exchanger 330 having a dry channel 324 defined by a nonporous moistureimpervious barrier or walls 326. A portion of the sensibly cooled air stream flowing through the dry channel may be redirected at outlet 328 via conduit 331 to the inlet or fan 302 across dampers 305A and 305L. A channel termed a "wet" channel 336 is located downstream the dry channel 324. The wet channel 336 is provided on its interior surfaces with a hydrophilic porous material 334. Dry or sensible cooling occurs along dry channel 324 and adiabatic evaporative cooling occurs through channel 336. The air discharged from channel 336 is directed either to discharge across damper 305Y or to air washer 342 through conduit 340 and across damper 305C. Some air may be directed to channel 370 across damper 305D.

Washer 342 has a housing which defines a sump 344 in its lower end and an intermediate washing zone 346 which, as is conventional, contains an extended surface evaporative media. A distributor 348 extends across the upper end of the housing of the washer and cooled water is supplied from the washer via return line 350 back to the distributor 348 or to remote water-to-desiccant heat exchanger 352. Recirculation pump 354 is provided and along with valves 360, 362, 364 controls the recirculation flow path. Additional make-up water may be provided from a remote source across valve 362.

The air exiting the upper end of the air washer is delivered via conduit 366 to the inlet of wet channel 370 of heat exchanger 330. Wet channel 370 is arranged on the opposite side of a common barrier or wall parallel with channels 324 and 336. The interior surface of channel 370 is coated with a hydrophilic, porous media 372.

Auxiliary fan 380 has its inlet connected to an ambient air source across damper 305K. As indicated in FIG. 3, the inlet also selectively communicates across dampers 305A and 305M with the air flow exiting the dry channel 324. A portion or all of the flow through wet channel 370 may be directed to the inlet of primary fan 302 by means of conduit 384 across damper 305P. Damper 305N is closed. The condenser 390 is part of the desiccant regeneration system.

The system further includes a desiccant-to-desiccant heat exchanger 392, condensate tank 394, generator 396 and steam-to-liquid heat exchanger 398. Generator 396 is heated by heat source 399 which may be fueled by any convenient heat source.

In operation, the auxiliary fan 380 supplies air to condenser 390 and/or to wet channel 370. Depending on conditions, dampers 305K and 305A will be adjusted to provide either 100% outside air or 100% air from dry channel 324 or a mixture of these streams. At some conditions fan 380 is not operational and main fan 302 supplies air to the condenser 390 by means of conduits 304 and 385. In this case, the dampers 305K and 305M are closed and dampers 305J and 305F are open.

Figure 3B:
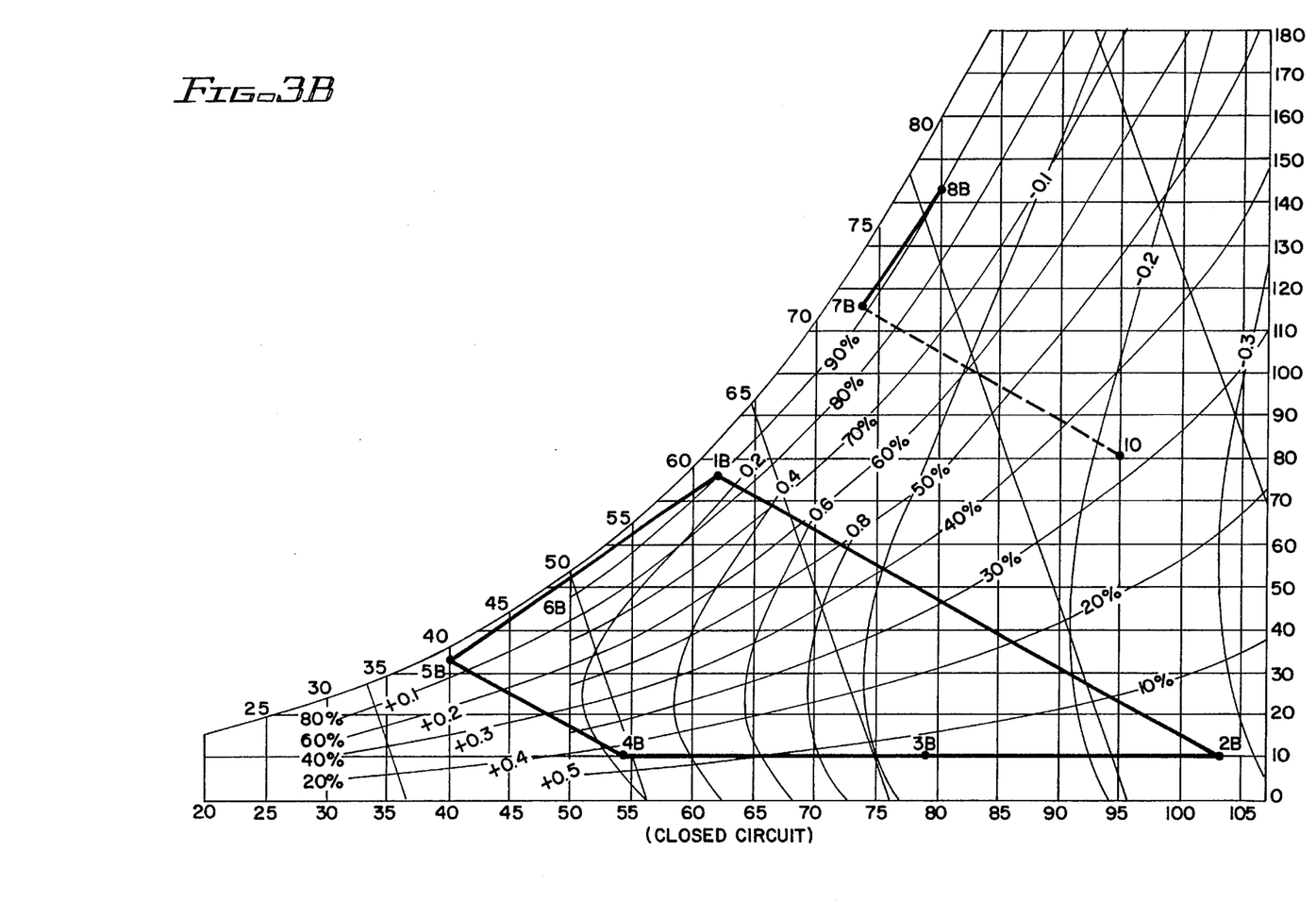

FIGS. 3 & 3B (Closed Cycle)

The closed cycle operation of the system of FIG. 3 is represented on FIGS. 3B. The process conditions are indicated by points 1B to 8B. In operation primary fan 302 and auxiliary fan 380 are both energized. Pumps 354, 383, 391 and 395 are operating and the generator 396 is energized and supplied with heat at heat source 399. Air dampers 305C, 305F, 305P, 305K and 305Z are open. Dampers 305N, 305M, 305G, 305J and 305Y are closed. Dampers 305A, 305D and 305L may be either open, closed or partially open.

The concentrated, cold liquid desiccant solution is sprayed downwardly in the air washer/dryer 308 by means of distributor 314. The desiccant solution contacts the air stream flowing countercurrently upwardly through the desiccant. The interaction between the desiccant solution and the air stream will result in dehumidification of the air. The air conditions entering and leaving the washer/dryer 308 are illustrated in the accompanying psychrometric chart of FIG. 3B by points 1B and 2B, respectively. The water enriched desiccant solution is circulated from the sump at 310 of the washer/dryer by pump 383 to the heat exchanger 392 and then to the generator 396. Generator 396 is heated by input 399 by an energy source such as natural gas, solar energy or electricity to maintain the desiccant solution at boiling conditions. The boiling condition will result in evaporation of the water from the desiccant solution and increase the desiccant concentration within the solution. The concentrated desiccant solution at high heat is circulated from generator 396 by pump 391 through heat exchanger 392 and returns to heat exchanger 352. The heat exchangers 392 and 352 extract excessive heat from the solution prior to introduction into the air washer/dryer at distributor 314.

The saturated water vapor (steam) at approximately atmospheric pressure exits heat generator 398 and is directed into air-cooled condenser 390 where it is condensed. The condensate from the condenser is collected in tank 394 for use as a water source supplied by pump 395 to wet channels 370 and to the wet media 334 in the adiabatic evaporization stage 336.

FIGS. 3 & 3A (Open Circuit)

The open cycle operation is similar to the closed circuit and is represented on FIG. 3A. In the open cycle, ambient air at conditions typified by conditions 1A is successively treated to provide cold supply air at conditions 5A exiting the channel 336. In the open cycle the dampers are positioned as follow: 305P, 305C are closed and 305G, 305Y, 305D, 305N, 305Z and 305F are open. Dampers 305J, 305A, 305L, 305M and 305K may be open or closed.

The main air flow is directed primarily through the dry channel 324 of heat exchanger 330. Part of the air exiting the dry channel may be directed to a point of use across damper 305Y. The air is dehumidified in washer/dryer 308 prior to cooling the heat exchanger 330. The water from sump 344 of the air washer may be directed to a point of use via conduit 345. All of the water from the air washer sump 334 or a mixture of this water with return water from the user at 362 is supplied by pump 354 may be recirculated to distributor 348 or to the heat exchanger 352.

From the foregoing, it will be seen that the present invention provides an efficient and versatile system for generating cold gas, cold fluid or a mixture and which avoids use of conventional, potentially harmful refrigerants. The system has various operating modes. Accordingly, various changes and modifications can be made to the system as apparent to those skilled in the art. The heat exchanger described may be of various types but counterflow types are preferred as having the best efficiency. Similarly, counterflow type air washers are preferred.

It will be obvious to those skilled in the art to make various changes, alterations and modifications to the system described herein. To the extent such changes, alterations and modifications do not depart from the spirit and scope of the appended claims, they are intended to be encompassed therein.

I claim:

1. A closed loop process for treatment of a process air stream for generation of both a chilled water supply and a chilled air supply, said process comprising the steps of:

(a) initially contacting the process air stream with a desiccant in a desiccant module to remove moisture from the process air stream resulting in a dried process air stream;

(b) directing the dried process air stream to an initial air-to-water heat exchanger to sensibly cool the process air stream, said initial air-to-water heat exchanger being in communication with cooling water from a cooling tower;

(c) directing the process air exiting the initial heat exchanger through successive heat exchangers to further gradually cool the process air stream, said successive heat exchangers being provided cooling water from an air washer;

(d) directing the process air stream discharged from the said successive heat exchangers to the said air washer to contact and chill the fluid therein, said chilled fluid collecting in a sump in said air washer;

(e) directing a part of the chilled fluid from the sump of the air washer to said successive heat exchanges and a part to a secondary heat exchanger for remote use in a closed loop; and (f) redirecting at least a part of air from the air washer to said desiccant module as part of the process air stream.

2. The process of claim 1 wherein the process is carried out as an open system and wherein the air stream is ambient air and cool air is generated.

3. The process of claim 1 wherein a part of the cooled air is returned to the system and cool water is generated in said direct cooling stage.

4. The process of claim 1 wherein said evaporative cooling stage includes an evaporative media with a water supply for wetting the media.

5. The process of claim 1 wherein said cooled supply gas is air and the air is subjected to treatment in a counter-flow air washer having an upper water distribution manifold and a lower sump.

6. The process of claim 1 wherein said air washer has a water distributor.

* * * * *